(12) United States Patent
McGrady et al.

(10) Patent No.: US 12,012,503 B2
(45) Date of Patent: Jun. 18, 2024

(54) IMPACT-MODIFIED BIODEGRADABLE POLYMER COMPOSITIONS

(71) Applicant: Ticona LLC, Florence, KY (US)

(72) Inventors: Christopher McGrady, Walton, KY (US); Rongfu Li, Blacksburg, VA (US); Michael Combs, Shady Spring, WV (US); Xiaowei Zhang, Union, KY (US); Suresh Subramonian, Cary, NC (US)

(73) Assignee: TICONA LLC., Florence, KY (US)

( * ) Notice: Subject to any disclaimer, the term of this patent is extended or adjusted under 35 U.S.C. 154(b) by 0 days.

(21) Appl. No.: 17/117,939

(22) Filed: Dec. 10, 2020

(65) Prior Publication Data

US 2021/0171740 A1 Jun. 10, 2021

Related U.S. Application Data

(60) Provisional application No. 63/090,349, filed on Oct. 12, 2020, provisional application No. 62/946,125, filed on Dec. 10, 2019.

(51) Int. Cl.
  *C08L 1/12* (2006.01)
(52) U.S. Cl.
  CPC ............. *C08L 1/12* (2013.01); *C08L 2207/53* (2013.01)
(58) Field of Classification Search
  CPC ................................ C08L 1/12; C08L 2207/53
  See application file for complete search history.

(56) References Cited

U.S. PATENT DOCUMENTS

| 5,478,386 | A  | 12/1995 | Itoh et al. |
| 5,580,911 | A  | 12/1996 | Buchanan et al. |
| 6,460,777 | B2 | 10/2002 | Float et al. |
| 6,669,771 | B2 | 12/2003 | Tokiwa et al. |
| 7,214,286 | B2 | 5/2007  | Torris et al. |
| 7,678,444 | B2 | 3/2010  | Tedford et al. |
| 7,718,718 | B2 | 5/2010  | Kanzawa et al. |
| 8,334,347 | B2 | 12/2012 | Ding et al. |
| 8,445,604 | B2 | 5/2013  | Li et al. |
| 8,524,832 | B2 | 9/2013  | Cygan |
| 8,563,140 | B2 | 10/2013 | Dellinger et al. |
| 8,851,084 | B2 | 10/2014 | Lemmouchi et al. |
| 8,906,488 | B2 | 12/2014 | Lee et al. |

(Continued)

FOREIGN PATENT DOCUMENTS

| CN | 103232618 A | 8/2013 |
| CN | 103467677 B | 12/2013 |

(Continued)

OTHER PUBLICATIONS

International Search Report Corresponding to Application No. PCT/US2020/064205 dated Mar. 3, 2021.

(Continued)

*Primary Examiner* — Ling Siu Choi
*Assistant Examiner* — Olga Lucia Donahue
(74) *Attorney, Agent, or Firm* — DORITY & MANNING, P.A.

(57) ABSTRACT

A polymer composition containing cellulose acetate in combination with one or more impact modifiers is described. The polymer composition can also contain a plasticizer and a bio-based polymer in addition to the cellulose acetate. The polymer composition is formulated so as to have properties similar to petroleum-based polymers for producing, for example, single-use biodegradable articles.

17 Claims, 9 Drawing Sheets

(56) References Cited

U.S. PATENT DOCUMENTS

| | | | |
|---|---|---|---|
| 9,062,186 | B2 | 6/2015 | Longdon et al. |
| 9,328,239 | B2 | 5/2016 | Krishnaswamy |
| 9,441,096 | B2 | 9/2016 | Yao et al. |
| 9,550,884 | B2 | 1/2017 | Yontz et al. |
| 9,605,140 | B2 | 3/2017 | Yao et al. |
| 10,138,357 | B2 | 11/2018 | Yao et al. |
| 10,144,825 | B2 | 12/2018 | Topolkaraev et al. |
| 10,308,790 | B2 | 6/2019 | Yao |
| 11,286,316 | B2 | 3/2022 | Bhargava et al. |
| 2008/0256806 | A1 | 10/2008 | Medling et al. |
| 2011/0073008 | A1 | 3/2011 | Lee et al. |
| 2011/0192605 | A1 | 8/2011 | Wann |
| 2012/0238673 | A1 | 9/2012 | Longdon et al. |
| 2014/0073745 | A1 | 3/2014 | Bailey et al. |
| 2014/0272131 | A1 | 9/2014 | Combs et al. |
| 2014/0274820 | A1 | 9/2014 | Wann |
| 2015/0174868 | A1 | 6/2015 | Mehlmann et al. |
| 2015/0183196 | A1 | 7/2015 | Zaikov |
| 2015/0307754 | A1 | 10/2015 | Combs et al. |
| 2015/0361310 | A1 | 12/2015 | Combs et al. |
| 2015/0361311 | A1 | 12/2015 | Combs et al. |
| 2016/0068656 | A1 | 3/2016 | Budhavaram et al. |
| 2016/0068665 | A1 | 3/2016 | Budhavaram et al. |
| 2016/0326343 | A1 | 11/2016 | Ambekar et al. |
| 2017/0037218 | A1 | 2/2017 | Kadoma et al. |
| 2018/0127740 | A1 | 5/2018 | Morhet et al. |
| 2018/0362729 | A1 | 12/2018 | Lu et al. |
| 2019/0031860 | A1 | 1/2019 | Moriyama et al. |
| 2019/0092927 | A1 | 3/2019 | Tanaka et al. |
| 2019/0092929 | A1 | 3/2019 | Tanaka et al. |
| 2019/0276562 | A1 | 9/2019 | Essaidi |
| 2019/0276637 | A1 | 9/2019 | Yao et al. |
| 2019/0276638 | A1 | 9/2019 | Yao et al. |
| 2019/0276640 | A1 | 9/2019 | Tanaka et al. |
| 2019/0276643 | A1 | 9/2019 | Miyazaki et al. |
| 2019/0276644 | A1 | 9/2019 | Yao et al. |
| 2019/0359794 | A1 | 11/2019 | An et al. |
| 2020/0172710 | A1 | 6/2020 | Tanaka et al. |
| 2020/0299447 | A1 | 9/2020 | Dang et al. |
| 2021/0040311 | A1 | 2/2021 | Tanaka et al. |

FOREIGN PATENT DOCUMENTS

| | | | |
|---|---|---|---|
| CN | 104177795 | A | 12/2014 |
| CN | 104479310 | A | 4/2015 |
| CN | 104744905 | A | 7/2015 |
| CN | 103193964 | B | 8/2015 |
| CN | 104841284 | A | 8/2015 |
| CN | 104988598 | A | 10/2015 |
| CN | 105001604 | A | 10/2015 |
| CN | 105239203 | A | 1/2016 |
| CN | 103897375 | B | 3/2016 |
| CN | 105440610 | A | 3/2016 |
| CN | 103772751 | B | 4/2016 |
| CN | 105462195 | A | 4/2016 |
| CN | 105670288 | A | 6/2016 |
| CN | 103756018 | B | 8/2016 |
| CN | 105038167 | B | 8/2016 |
| CN | 105885367 | A | 8/2016 |
| CN | 106076126 | A | 11/2016 |
| CN | 107163345 | A | 9/2017 |
| CN | 107177178 | A | 9/2017 |
| CN | 107236269 | A | 10/2017 |
| CN | 107663282 | A | 2/2018 |
| CN | 107926368 | A | 4/2018 |
| CN | 108342060 | A | 7/2018 |
| CN | 108440928 | A | 8/2018 |
| CN | 108456407 | A | 8/2018 |
| CN | 108498874 | A | 9/2018 |
| CN | 108674817 | A | 10/2018 |
| CN | 108727751 | A | 11/2018 |
| CN | 108948748 | A | 12/2018 |
| CN | 109081954 | A | 12/2018 |
| CN | 109627535 | A | 4/2019 |
| CN | 109897359 | A | 6/2019 |
| CN | 110168005 | A | 8/2019 |
| EP | 0577562 | B1 | 10/2002 |
| EP | 792913 | B1 | 8/2003 |
| ID | 201700672 | S | 12/2017 |
| IN | 185861 | B | 5/2021 |
| JP | 2000219776 | A | 8/2000 |
| JP | 2000219777 | A | 8/2000 |
| JP | 2001064431 | A | 3/2001 |
| JP | 2001103845 | A | 4/2001 |
| JP | 2001161187 | A | 6/2001 |
| JP | 2001181429 | A | 7/2001 |
| JP | 2001200084 | A | 7/2001 |
| JP | 2001294792 | A | 10/2001 |
| JP | 3680935 | B2 | 8/2005 |
| JP | 2006213916 | A | 8/2006 |
| JP | 3860346 | B2 | 12/2006 |
| JP | 4979111 | B2 | 7/2012 |
| JP | 4996896 | B2 | 8/2012 |
| JP | 5109449 | B2 | 12/2012 |
| JP | 5266659 | B2 | 8/2013 |
| JP | 5375556 | B2 | 12/2013 |
| JP | 2018021148 | A | 2/2018 |
| JP | 2019065099 | A | 4/2019 |
| KR | 20140010742 | A | 1/2014 |
| KR | 101788632 | B1 | 10/2017 |
| KR | 20180121129 | A | 11/2018 |
| WO | WO2013071218 | A1 | 5/2013 |
| WO | WO 2015076250 | A1 | 5/2015 |
| WO | WO 2016188961 | A1 | 12/2016 |
| WO | WO 2019160908 | A1 | 8/2019 |
| WO | WO 2019171611 | A1 | 9/2019 |
| WO | WO2021046334 | A1 | 3/2021 |

OTHER PUBLICATIONS

Arkema, Biostrength® 150: Opaque Impact Modifier.
Krishnaswamy et al., Impact Modification of PLA Using Biobased, Biodegradable Mirel™ PHB Copolymers, 2014, pp. 1-4.
Polybutylene Adipate Terephthalate, *Wikipedia, The Free Encyclopedia*, 2022, https://en.wikipedia.org/w/index.php?title=Polybutylene_adipate_terephthalate&oldid=111858264.
Coltelli, Mallegni, Rizzo, Cinelli and Lazzeri, Blends Containing Cellulose Acetate (CA) Prepared by Reactive Extrusion, *Materials* 2019, vol. 12, 270, www.MDPI.com/journal/materials, pp. 1-20.
Phuong, Verstichel, Cinelli, Anguillesi, Coltelli and Lazzeri, Cellulose Acetate Blends—Effect of Plasticizers on Properties and Biodegradability, *J. Renew. Mater.*, vol. 2, No. 1, Mar. 2014, pp. 35-41.
Chinese Office Action Corresponding to Application No. 202080096135.6 dated Feb. 15, 2023.

IMPACT-MODIFIED BIODEGRADABLE POLYMER COMPOSITIONS

RELATED APPLICATIONS

The present application is based upon and claims priority to U.S. Provisional Patent Application Ser. No. 62/946,125, having a filing date of Dec. 10, 2019 and U.S. Provisional Patent Application Ser. No. 63/090,349, having a filing date of Oct. 12, 2020, both of which are incorporated herein by reference.

BACKGROUND

Each year, the global production of plastics continues to increase. Over one-half of the amount of plastics produced each year are used to produce plastic bottles, containers, drinking straws, and other single-use items. For example, over 100 million disposable plastic straws are manufactured and placed in use every year.

The discarded, single-use plastic articles, including plastic drinking bottles and straws, are typically not recycled and end up in landfills. In addition, many of these items are not properly disposed of and end up in streams, lakes, and in the oceans around the world. In fact, plastic waste tends to agglomerate and concentrate in oceans in certain areas of the world due to currents and the buoyancy of the products.

Plastic waste can be harmful to ecosystems and to animals, including marine life and birds. Plastic waste, for instance, disintegrates very slowly into smaller and smaller pieces that become ingested by aquatic organisms and fish.

In view of the above, those skilled in the art have attempted to produce plastic articles made from biodegradable polymers. Many biodegradable polymers, however, lack the physical properties and characteristics of conventional polymers, such as polypropylene and/or polyethylene terephthalate.

Cellulose esters have been proposed in the past as a replacement to some petroleum-based polymers or plastics. Cellulose esters, for instance, are generally considered environmentally-friendly polymers because they are recyclable, degradable and derived from renewable resources, such as wood pulp. Problems have been experienced, however, in producing cellulose ester compositions that have comparable properties to many petroleum-based polymers. For example, cellulose esters are relatively stiff and may not have sufficient impact strength properties for some applications. In addition, the melting temperature of cellulose ester polymers is very close to the degradation temperature, further creating obstacles to melt processing the polymers successfully.

In view of the above, a need currently exists for polymer compositions containing biodegradable components that can be used to replace conventional plastic materials. A need also exists for polymer compositions containing cellulose ester polymers that can be easily melt processed and/or have improved impact resistance strength.

SUMMARY

In general, the present disclosure is directed to a polymer composition containing a cellulose acetate polymer in combination with various other polymer components in order to produce a polymer composition having improved impact resistance properties in comparison to a composition only containing the cellulose acetate. The resulting composition can be used to produce various different articles, including plastic containers, beverage holders, automotive parts, consumer appliance parts, and the like.

For instance, in one embodiment, the present disclosure is directed to a polymer composition comprising a cellulose acetate, a plasticizer, and at least one impact modifier. The polymer composition can also contain at least one bio-based polymer in addition to cellulose acetate. In accordance with the present disclosure, the impact modifier can comprise a bio-based impact modifier, acrylic core/shell particles, or mixtures thereof. The polymer composition can be formulated so as to exhibit an Izod notched impact strength of about 100 J/m or greater, such as about 110 J/m or greater, such as about 125 J/m or greater, such as about 150 J/m or greater, such as about 175 J/m or greater, such as about 200 J/m or greater when tested at 23° C. according to ISO Test 180 using a specimen that has dimensions of 80 mm×10 mm×4 mm.

As described above, the impact modifier can comprise acrylic core/shell particles. The acrylic core/shell particles can include a core comprised of a polymer formed from a butyl acrylate monomer, an ethylhexyl acrylate monomer, or from a mixture thereof. The shell, in one aspect, can be comprised of methyl metacrylate. The core/shell particles can also contain a bio-based polymer layer in addition to the shell and the core.

Bio-based impact modifiers that may be used in the polymer composition include a polybutylene adipate terephthalate. The bio-based impact modifier may also comprise a polybutylene succinate. In one embodiment, the polymer composition contains a bio-based impact modifier and acrylic core/shell particles.

One or more impact modifiers can be present in the polymer composition in an amount of about 5% or greater, such as in an amount of about 10% or greater, such as in an amount of about 12% or greater. The one or more impact modifiers are generally present in an amount of about 25% or less, such as in an amount of about 20% or less, such as in an amount of about 18% or less by weight.

The cellulose acetate present in the polymer composition can comprise primarily cellulose diacetate. For example, cellulose diacetate can make up greater than about 90%, such as greater than about 95%, such as greater than about 98% by weight of the cellulose acetate. The cellulose acetate can be present in the polymer composition in an amount generally from about 15% by weight to about 85% by weight, such as in an amount from about 55% by weight to about 80% by weight.

As described above, the polymer composition can contain a plasticizer. Plasticizers that may be included in the polymer composition include triacetin, tris(clorisopropyl) phosphate, tris(2-chloro-1-methylethyl) phosphate, glycerin, monoacetin, diacetin, triethyl citrate, acetyl triethyl citrate, or mixtures thereof. One or more plasticizers can be present in the polymer composition in an amount greater than about 8% by weight, such as in an amount greater than about 12% by weight, such as in an amount greater than about 15% by weight, and generally in an amount less than about 40% by weight, such as in an amount less than about 35% by weight. In one embodiment, the use of a plasticizer is minimized and the composition contains one or more plasticizers in an amount of about 19% by weight or less, such as about 15% by weight or less, such as about 12% by weight or less.

In addition to containing a bio-based impact modifier and cellulose acetate the polymer composition can also contain other bio-based polymers. The other bio-based polymers, for instance, may include polylactic acid, a polycaprolactone, or a polyhydroxyalkanoate. For example, in addition to an impact modifier, the polymer composition may contain a polyhydroxyalkanoate in combination with a polylactic acid. In one embodiment, a polyhydroxyalkanoate and/or a polycaprolactone may also serve as impact modifiers if the polymer has a low glass transition temperature. For example, many bio-based polymers can serve as impact modifiers if they have a glass transition temperature of less than about −10° C.

Various different articles can be made from the polymer composition. For instance, the polymer composition can be used to produce drinking straws, beverage holders, automotive parts such as interior automotive parts, knobs, door handles, lids, packaging, cutlery, consumer appliance parts, containers and any other suitable disposable product.

The cellulose ester polymer composition can also be used to produce molded articles for use in the medical field. For example, the composition can be used to produce housing for medical devices that provides a warm touch. The housing can be made from a composition containing a cellulose ester polymer, an impact modifier, a plasticizer and optionally a bio-based polymer.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
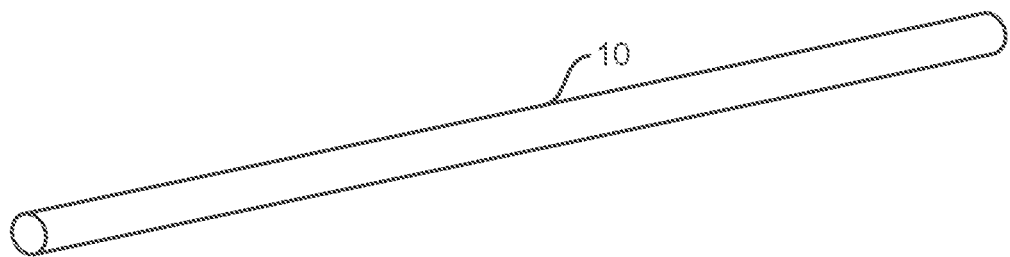
FIG. 1 is a perspective view of a drinking straw that may be made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to polymer compositions containing a cellulose acetate in combination with other polymers and components that improve the physical properties of the cellulose acetate. Polymer compositions formulated in accordance with the present disclosure, for instance, can have dramatically improved impact resistance properties. In addition, the polymer composition of the present disclosure can be formulated to be biodegradable and thus environmentally friendly. The polymer composition can be used to form all different types of products using any suitable molding technique, such as extrusion, injection molding, rotational molding, gel processing, and the like.

In general, the polymer composition of the present disclosure contains a cellulose acetate in combination with at least one impact modifier and at least one plasticizer. The impact modifier can be a bio-based impact modifier and/or can be acrylic core/shell particles. In addition to the cellulose acetate and an impact modifier, the polymer composition can also optionally contain at least one other bio-based polymer.

As used herein, a "bio-based polymer" refers to a polymer produced at least partially from renewable biomass sources, such as produced from plant matter or food waste. For example, a bio-based polymer can be a polymer produced from greater than 30% renewable resources, such as greater than about 40% renewable resources, such as greater than about 50% renewable resources, such as greater than about 60% renewable resources, such as greater than about 70% renewable resources, such as greater than about 80% renewable resources, such as greater than about 90% renewable resources. Bio-based polymers are to be distinguished from polymers derived from fossil resources such as petroleum. Bio-based polymers can be bio-derived meaning that the polymer originates from a biological source or produced via a biological reaction, such as through fermentation or other microorganism process. Although a cellulose ester polymer can be considered a bio-based polymer, the term herein refers to other bio-based polymers that can be combined with cellulose ester polymers.

In accordance with the present disclosure, the cellulose acetate is combined with at least one impact modifier, at least one plasticizer, and optionally one or more additional bio-based polymers in a manner that can dramatically improve the physical properties of the polymer composition. For example, the polymer composition can be formulated so as to have unexpectedly improved impact resistance, while still remaining greater than 50% by weight, such as greater than about 70% by weight, such as greater than about 90% by weight biodegradable. The one or more impact modifiers have also been found to increase the melt strength of the polymer composition.

The polymer compositions formulated in accordance with the present disclosure, for instance, can have an Izod notched impact strength of about 100 J/m or greater, such as about 110 J/m or greater, such as about 125 J/m or greater, such as about 150 J/m or greater, such as about 175 J/m or greater, such as about 200 J/m or greater, such as about 300 J/m or greater, such as about 400 J/m or greater when tested at 23° C. The Izod notched impact strength is generally less than about 700 J/m, such as less than about 600 J/m.

In addition to increasing impact strength resistance, polymer compositions formulated in accordance with the present disclosure can also have lower stiffness properties. For example, the polymer composition of the present disclosure can be formulated so as to exhibit a flexural modulus of about 2000 MPa or less, such as about 1900 MPa or less, such as about 1800 MPa or less, such as about 1700 MPa or less, such as about 1600 MPa or less. The flexural modulus can be about 500 MPa or greater, such as about 700 MPa or greater, such as about 1000 MPa or greater, such as about 1200 MPa or greater. The flexural modulus of the polymer composition may be measured by ISO Test 178:2010.

The polymer composition of the present disclosure can exhibit a tensile modulus about 2000 MPa or less, such as about 1900 MPa or less, such as about 1800 MPa or less, such as about 1700 MPa or less, such as about 1600 MPa or less. The tensile modulus can be about 800 MPa or greater, such as about 900 MPa or greater, such as about 1000 MPa or greater, such as about 1200 MPa or greater. The tensile modulus of the polymer composition can be measured by ISO Test 527-1:2012.

The polymer composition of the present disclosure can also display improved stretch characteristics. For instance, the polymer composition can exhibit an elongation at break of about 10% or greater, such as about 12% or greater, such as about 15% or greater, such as about 20% or greater, such as about 30% or greater, such as about 40% or greater, such as about 50% or greater, such as about 60% or greater, such as about 70% or greater, such as about 80% or greater. The elongation at break can be less than about 500%, such as less than about 400%, such as less than about 200%, such as less than about 150%. Elongation at break can be measured according to ISO Test 527-1:2012.

In general, any suitable cellulose ester polymer can be incorporated into the polymer composition of the present disclosure. In one aspect, the cellulose ester polymer is a cellulose acetate.

Cellulose acetate may be formed by esterifying cellulose after activating the cellulose with acetic acid. The cellulose may be obtained from numerous types of cellulosic material, including but not limited to plant derived biomass, corn stover, sugar cane stalk, bagasse and cane residues, rice and wheat straw, agricultural grasses, hardwood, hardwood pulp, softwood, softwood pulp, cotton linters, switchgrass, bagasse, herbs, recycled paper, waste paper, wood chips, pulp and paper wastes, waste wood, thinned wood, willow, poplar, perennial grasses (e.g., grasses of the Miscanthus family), bacterial cellulose, seed hulls (e.g., soy beans), cornstalk, chaff, and other forms of wood, bamboo, soyhull, bast fibers, such as kenaf, hemp, jute and flax, agricultural residual products, agricultural wastes, excretions of livestock, microbial, algal cellulose, seaweed and all other materials proximately or ultimately derived from plants. Such cellulosic raw materials are preferably processed in pellet, chip, clip, sheet, attritioned fiber, powder form, or other form rendering them suitable for further purification.

Cellulose esters suitable for use in producing the composition of the present disclosure may, in some embodiments, have ester substituents that include, but are not limited to, $C_1$-$C_{20}$ aliphatic esters (e.g., acetate, propionate, or butyrate), functional $C_1$-$C_{20}$ aliphatic esters (e.g., succinate, glutarate, maleate) aromatic esters (e.g., benzoate or phthalate), substituted aromatic esters, and the like, any derivative thereof, and any combination thereof.

The cellulose acetate used in the composition may be cellulose diacetate or cellulose triacetate. In one embodiment, the cellulose acetate comprises primarily cellulose diacetate. For example, the cellulose acetate can contain less than 1% by weight cellulose triacetate, such as less than about 0.5% by weight cellulose triacetate. Cellulose diacetate can make up greater than 90% by weight of the cellulose acetate, such as greater than about 95% by weight, such as greater than about 98% by weight, such as greater than about 99% by weight of the cellulose acetate.

In general, the cellulose acetate can have a molecular weight of greater than about 10,000, such as greater than about 20,000, such as greater than about 30,000, such as greater than about 40,000, such as greater than about 50,000. The molecular weight of the cellulose acetate is generally less than about 300,000, such as less than about 250,000, such as less than about 200,000, such as less than about 150,000, such as less than about 100,000, such as less than about 90,000, such as less than about 70,000, such as less than about 50,000. The molecular weights identified above refer to the number average molecular weight. Molecular weight can be determined using gel permeation chromatography using a polystyrene equivalent or standard.

The cellulose ester polymer or cellulose acetate can have an intrinsic viscosity of generally greater than about 0.5 dL/g, such as greater than about 0.8 dL/g, such as greater than about 1 dL/g, such as greater than about 1.2 dL/g, such as greater than about 1.4 dL/g, such as greater than about 1.6 dL/g. The intrinsic viscosity is generally less than about 2 dL/g, such as less than about 1.8 dL/g, such as less than about 1.7 dL/g, such as less than about 1.65 dL/g. Intrinsic viscosity may be measured by forming a solution of 0.20 g/dL cellulose ester in 98/2 wt/wt acetone/water and measuring the flow times of the solution and the solvent at 30° C. in a #25 Cannon-Ubbelohde viscometer. Then, the modified Baker-Philippoff equation may be used to determine intrinsic viscosity ("IV"), which for this solvent system is Equation 1.

$$IV = \left(\frac{k}{c}\right)(\text{antilog}((\log n_{rel})/k) - 1) \quad \text{Equation 1}$$

$$\text{where } n_{rel} = \left(\frac{t_1}{t_2}\right),$$

$t_1$=the average flow time of solution (having cellulose ester) in seconds, $t_2$=the average flow times of solvent in seconds, k=solvent constant (10 for 98/2 wt/wt acetone/water), and c=concentration (0.200 g/dL).

The cellulose acetate is generally present in the polymer composition in an amount greater than about 15% by weight, such as in an amount greater than about 25% by weight, such as in an amount greater than about 35% by weight, such as in an amount greater than about 45% by weight, such as in an amount greater than about 55% by weight. The cellulose acetate is generally present in the polymer composition in an amount less than about 85% by weight, such as in an amount less than about 80% by weight, such as in an amount less than about 75% by weight, such as in an amount less than about 70% by weight, such as in an amount less than about 65% by weight.

The cellulose acetate is combined with one or more impact modifiers in accordance with the present disclosure in order to increase the impact resistance properties of articles made from the polymer composition. In accordance with the present disclosure, the impact modifiers are carefully selected to not only achieve the desired increase in mechanical properties, but the impact modifiers are also compatible with the other components contained in the polymer composition. In addition, impact modifiers are selected that do not substantially detract from the biodegradable properties of the cellulose acetate and other biobased components contained in the composition.

For example, in one embodiment, the impact modifier is a bio-based impact modifier. Bio-based impact modifiers are polymers made from renewable raw materials. Bio-based impact modifiers are not derived from petroleum resources.

Bio-based impact modifiers that may be used in accordance with the present disclosure include polybutylene adipate terephthalate (PBAT), polybutylene succinate, or mixtures thereof. PBAT is a copolymer of polybutylene adipate and butylene terephthalate, and is formed from adipic acid, 1,4-butane diol, and terephthalic acid. PBAT is a random copolymer and contains a flexible aliphatic chain and a rigid aromatic chain. PBAT has high toughness and high temperature resistance, especially for a polymer that is biodegradable, due to the presence of ester bonds.

The melt index of the PBAT impact modifier is generally greater than about 2 g/10 min, such as greater than about 4 g/10 min, such as greater than about 6 g/10 min, and generally less than about 24 g/10 min, such as less than about 20 g/10 min, such as less than about 18 g/10 min, such as less than about 15 g/10 min when tested according to ISO Test 1133 at a temperature of 190° C. and a load of 2.16 kg.

The bio-based impact modifier may also be polybutylene succinate. Polybutylene succinate may be used alone or in combination with PBAT. Polybutylene succinate (PBS) is a biodegradable aliphatic polyester that possesses excellent mechanical properties and good heat resistance properties. Polybutylene succinate generally has a melting point of approximately 114° C. and has a glass transition temperature of approximately −30° C. Polybutylene succinate can have a degree of crystallinity of from about 30% to about 50% and possesses good stretch properties.

When tested according to ISO Test 1133, polybutylene succinate can generally have a melt flow rate of less than about 20 g/10 min, such as less than about 15 g/10 min, such as less than about 12 g/10 min, and generally greater than about 2 g/10 min, such as greater than about 5 g/10 min. The melt flow rate can be measured at a temperature of 190° C. and at a loading weight of 2.16 kg.

In addition to a bio-based impact modifier, the cellulose acetate can be combined with an acrylic core/shell type impact modifier. The core/shell impact modifier can be comprised of particles having a soft elastomeric core surrounded by a harder shell. Alternatively, the core/shell particles can include a hard core covered by a soft elastomeric or rubber-like layer, followed by a hard shell.

Although the elastomeric core or layer within the core/shell particle can be made from a butadiene rubber or other similar rubber, in one embodiment, the elastomeric layers or core is made from all-acrylic homopolymers or copolymers having a relatively low glass transition temperature. For instance, the elastomeric layer or core can be formed from butyl acrylate, ethylhexyl acrylate, or a butyl acrylate/styrene. The glass transition temperature of the elastomeric or rubber-like polymer can generally be low, such as less than about 40° C., such as less than about 25° C., such as less than about 20° C., such as less than about 15° C., and generally greater than about −10° C.

The elastomeric or rubber-like polymer contained within the shell/core particles can also be crosslinked. The polymer can be crosslinked by a multifunctional monomer. For example, a monomer can be selected that is copolymerizable with a monounsaturated monomer that may be present during formation of the polymer and has ethylenically multifunctional groups that have reactivity. Examples of crosslinking monomers include divinyl benzene, a glycol of di- and trimethacrylates and acrylates, a triol triacrylate, a methacrylate, an allyl methacrylate, or the like. A grafting monomer may also be incorporated into the product in order to enhance interlayer grafting. Grafting monomers that may be used include any polyfunctional crosslinking monomers.

In one embodiment, the acrylic core/shell impact modifier is an acrylate based copolymer with a core-shell polymer having a rubbery core, such as 1,3-dienes (also copolymers with vinyl aromatics) or alkyl acrylates with an alkyl group containing 4 or more carbons and the shell is grafted onto the core and is comprised of monomers such as vinyl aromatics (e.g., styrene), alkyl methacrylates (alkyl group having 1-4 carbons), alkyl acrylates (alkyl group having 1-4 carbons), and acrylonitrile.

In one aspect, the core of the particles can be made from a polymer or polymer mixture having a relatively low glass transition temperature, such as less than about −20° C., such as less than about −40° C. The shell of the particle, however, can be made from a polymer or polymer mixture that has a glass transition temperature that is higher or lower than the glass transition temperature of the core. For example, in one embodiment, a relatively hard shell can be used that has a higher glass transition temperature. Alternatively, the shell can be made from a polymer having a lower glass transition temperature than the core which may improve impact resistance and toughness in some embodiments.

Within the core/shell particles, the core can account for about 30% or greater of the weight of the total particle, such as 40% or greater, such as 50% or greater, such as 60% or greater, such as 70% or greater, such as 80% or greater, such as 85% or greater of the total weight of the particle. The core generally accounts for about 95% or less, such as about 90% or less, such as about 85% or less of the weight of the particle. The outer shell in the shell/core particle can account for greater than about 5% by weight, such as greater than about 10% by weight, such as greater than about 15% by weight, such as greater than about 25% by weight, such as greater than about 35% by weight of the particle. The outer shell generally accounts for about 70% by weight or less, such as about 50% by weight or less, such as about 20% by weight or less of the weight of the entire particle. Crosslinking monomers and/or grafting monomers can be present in the particle in an amount from about 0% to about 5% by weight.

In one embodiment, the core of the core/shell particle contains one or more acrylic polymers in an amount greater than about 80% by weight, such as in an amount greater than about 85% by weight, such as in an amount greater than about 90% by weight. The shell, on the other hand, can be made from methyl methacrylate. Methyl methacrylate can be contained in the shell in an amount greater than about 75% by weight, such as in an amount greater than about 85% by weight, such as in an amount greater than about 95% by weight. The outer shell may also contain butyl acrylate in an amount from about 0 to about 20% by weight and/or ethyl acrylate in an amount from about 0 to about 25% by weight. In one aspect, the core is formed from a butyl acrylate homopolymer, an ethylhexyl acrylate homopolymer, a copolymer of butyl acrylate and ethylhexyl acrylate, or mixtures thereof.

In one aspect, the core/shell particle can have a core that accounts for about 70% to about 90% by weight of the particle and can contain primarily butyl acrylate and/or 2-ethylhexyl acrylate and optionally 0 to about 15% by weight butadiene. The shell, on the other hand, can account for about 5% to about 30% by weight of the core/shell particle and can contain methyl methacrylate in an amount from about 75% to about 100% by weight. Optionally, the shell can contain butyl acrylate and/or ethyl acrylate in an amount from about 0 to about 25% by weight.

The particle size of the acrylic core/shell impact modifier can depend upon various factors and the desired result. In one aspect, the acrylic core/shell impact modifier is comprised of relatively small particles. For instance, the median particle size by volume (may be determined by light scattering) is less than about 150 microns, such as less than about 100 microns, such as less than about 50 microns, such as less than about 30 microns, such as less than about 10 microns. In one embodiment, relatively small sized particles are used that have a median particle size by volume of from about 0.25 microns to about 5 microns, such as from about 0.25 microns to about 1 micron, such as from about 0.28 microns to about 0.83 microns.

In another aspect, the core/shell impact modifier particles can have a relatively large size. For instance, the core/shell particles can have a median particle size by volume of greater than about 150 microns, such as greater than about 200 microns, such as greater than about 250 microns and generally less than about 1000 microns, such as less than about 500 microns, such as less than about 300 microns. In one embodiment, the particles have a median particle size of from about 125 microns to about 175 microns. In an alternative embodiment, the particles can have a median particle size of from about 250 microns to about 300 microns. In one embodiment, less than 2% of the particles have a size greater than 1000 microns. In an alternative embodiment, less than 15% of the particles have a particle size of greater than about 280 microns.

The amount of impact modifier incorporated into the polymer composition can also vary depending upon the type of impact modifier being used and various other factors. In general, one or more impact modifiers can be incorporated into the polymer composition in an amount of about 2% by weight or greater, such as in an amount of about 4% by weight or greater, such as in an amount of about 5% by weight or greater, such as in an amount of about 8% by weight or greater, such as in an amount of about 10% by weight or greater, such as in an amount of about 12% by weight or greater. One or more impact modifiers can be incorporated into the polymer composition generally in an amount of about 25% by weight or less, such as in an amount of about 20% by weight or less, such as in an amount of about 15% by weight or less. For example, bio-based impact modifiers can be incorporated into the polymer composition generally in an amount from about 3% to about 25% by weight, such as in an amount from about 10% to about 20% by weight. A core/shell impact modifier, on the other hand, may be incorporated into the polymer composition in an amount from about 2% by weight to about 15% by weight, such as in an amount from about 5% by weight to about 12% by weight in one aspect as non-limiting examples.

In addition to cellulose acetate and at least one impact modifier, the polymer composition can also contain a plasticizer. Plasticizers particularly well suited for use in the polymer composition include triacetin, monoacetin, diacetin, and mixtures thereof. Other suitable plasticizers include tris(clorisopropyl) phosphate, tris(2-chloro-1-methylethyl) phosphate, triethyl citrate, acetyl triethyl citrate, glycerin, or mixtures thereof.

Other examples of plasticizers include, but are not limited to, trimethyl phosphate, triethyl phosphate, tributyl phosphate, triphenyl phosphate, acetyl tributyl citrate, tributyl-o-acetyl citrate, dibutyl tartrate, ethyl o-benzoylbenzoate, n-ethyltoluenesulfonamide, o-cresyl p-toluenesulfonate, aromatic diol, substituted aromatic diols, aromatic ethers, tripropionin, tribenzoin, glycerin, glycerin esters, glycerol tribenzoate, glycerol acetate benzoate, polyethylene glycol, polyethylene glycol esters, polyethylene glycol diesters, di-2-ethylhexyl polyethylene glycol ester, glycerol esters, diethylene glycol, polypropylene glycol, polyglycoldiglycidyl ethers, dimethyl sulfoxide, N-methyl pyrollidinone, propylene carbonate, $C_1$-$C_{20}$ dicarboxylic acid esters, dimethyl adipate (and other dialkyl esters), di-butyl maleate, di-octyl maleate, resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, alkyl lactones (e.g., .gamma.-valerolactone), alkylphosphate esters, aryl phosphate esters, phospholipids, aromas (including some described herein, e.g., eugenol, cinnamyl alcohol, camphor, methoxy hydroxy acetophenone (acetovanillone), vanillin, and ethylvanillin), 2-phenoxyethanol, glycol ethers, glycol esters, glycol ester ethers, polyglycol ethers, polyglycol esters, ethylene glycol ethers, propylene glycol ethers, ethylene glycol esters (e.g., ethylene glycol diacetate), propylene glycol esters, polypropylene glycol esters, acetylsalicylic acid, acetaminophen, naproxen, imidazole, triethanol amine, benzoic acid, benzyl benzoate, salicylic acid, 4-hydroxybenzoic acid, propyl-4-hydroxybenzoate, methyl-4-hydroxybenzoate, ethyl-4-hydroxybenzoate, benzyl-4-hydroxybenzoate, glyceryl tribenzoate, neopentyl dibenzoate, triethylene glycol dibenzoate, trimethylolethane tribenzoate, butylated hydroxytoluene, butylated hydroxyanisol, sorbitol, xylitol, ethylene diamine, piperidine, piperazine, hexamethylene diamine, triazine, triazole, pyrrole, and the like, any derivative thereof, and any combination thereof.

In one aspect, a carbonate ester may serve as a plasticizer. Exemplary carbonate esters may include, but are not limited to, propylene carbonate, butylene carbonate, diphenyl carbonate, phenyl methyl carbonate, dicresyl carbonate, glycerin carbonate, dimethyl carbonate, diethyl carbonate, ethylene carbonate, propylene carbonate, isopropylphenyl 2-ethylhexyl carbonate, phenyl 2-ethylhexyl carbonate, isopropylphenyl isodecyl carbonate, isopropylphenyl tridecyl carbonate, phenyl tridecyl carbonate, and the like, and any combination thereof.

In still another aspect, the plasticizer can be a polyol benzoate. Exemplary polyol benzoates may include, but are not limited to, glyceryl tribenzoate, propylene glycol dibenzoate, diethylene glycol dibenzoate, dipropylene glycol dibenzoate, triethylene glycol dibenzoate, polyethylene glycol dibenzoate, neopentylglycol dibenzoate, trimethylolpropane tribenzoate, trimethylolethane tribenzoate, pentaerythritol tetrabenzoate, sucrose benzoate (with a degree of substitution of 1-8), and combinations thereof. In some instances, tribenzoates like glyceryl tribenzoate may be preferred. In some instances, polyol benzoates may be solids at 25° C. and a water solubility of less than 0.05 g/100 mL at 25° C.

In one aspect, the plasticizer is phthalate-free. In fact, the polymer composition can be formulated to be phthalate-free. For instance, phthalates can be present in the polymer composition in an amount of about 0.5% or less, such as in an amount of about 0.1% or less.

In general, one or more plasticizers can be present in the polymer composition in an amount from about 8% to about 40% by weight, such as in an amount from about 12% to about 35% by weight. In the past, it was believed that relatively high amounts of plasticizer were needed in order to produce a cellulose acetate composition capable of being melt processed. Due to the presence of at least one impact modifier and/or the presence of one or more bio-based polymers as described above, however, the amount of plasticizer can be significantly and dramatically reduced without compromising the melt processing characteristics of the composition. For example, in one aspect, one or more plasticizers can be present in the polymer composition in an amount of about 19% or less, such as in an amount of about 17% or less, such as in an amount of about 15% or less, such as in an amount of about 13% or less, such as in an amount of about 10% or less. One or more plasticizers are generally present in an amount from about 5% or greater, such as in an amount of about 10% or greater.

The cellulose acetate can be present in relation to the plasticizer such that the weight ratio between the cellulose acetate and the plasticizer is from about 60:40 to about 85:15, such as from about 70:30 to about 80:20. In one embodiment, the cellulose acetate to plasticizer weight ratio is about 75:25.

In accordance with the present disclosure, the polymer composition can also include one or more bio-based polymers in addition to the cellulose acetate. In one aspect, the bio-based polymer can be a polyester polymer, such as an aliphatic polyester. Particular bio-based polymers that may be incorporated into the polymer composition include polyhydroxyalkanoates, polylactic acid, polycaprolactone, or mixtures thereof.

In one aspect, the physical properties of the cellulose acetate can be particularly improved if at least one bio-based polymer is combined with the cellulose acetate that has a low glass transition temperature and/or is amorphous or is semi-crystalline. For example, a bio-based polymer can be selected for combining with the cellulose acetate that is completely or substantially amorphous or has a low degree of crystallinity. The degree of crystallinity is the fraction of the polymer that exists in an orderly state, having a lattice structure. For example, the bio-based polymer combined with the cellulose acetate can have a crystallinity of less than about 30%, such as less than about 25%, such as less than about 20%, such as less than about 15%, such as less than about 10%, such as less than about 5%. The degree of crystallinity can be determined using X-ray and electron diffraction, differential scanning calorimetry, infrared absorption (FTIR) or Raman spectroscopy.

The at least one bio-based polymer combined with the cellulose acetate can also have a relatively low glass transition temperature. For instance, the glass transition temperature of the bio-based polymer can be less than about 40° C., such as less than about 20° C., such as less than about 10° C., such as less than about 5° C., such as less than about 0° C., such as less than about −5° C., such as less than about −10° C., such as less than about −20° C. The glass transition temperature (Tg) is generally greater than about −40° C., such as greater than about −30° C.

In comparison, the glass transition temperature of cellulose acetate is generally from 160° C. to 180° C. Differences in glass transition temperatures can lead to compatibility issues. However, to the contrary, the use of a bio-based polymer with a low glass transition temperature and/or low crystallinity has been found to not only be compatible with cellulose acetate, but also improves many physical properties of the cellulose acetate including elongation to break and toughness. The addition of the bio-based polymer as described above can also reduce the flexural modulus.

In one aspect, the at least one bio-based polymer combined with the cellulose acetate is a polyhydroxyalkanoate. The polyhydroxyalkanoate can be a homopolymer or a copolymer. Polyhydroxyalkanoates, also known as "PHAs", are linear polyesters produced in nature by bacterial fermentation of sugar or lipids. More than 100 different monomers can be combined within this family to give materials with extremely different properties. Generally, they can be either thermoplastic or elastomeric materials, with melting-points ranging from 40 to 180° C. The most common type of PHAs is PHB (poly-beta-hydroxybutyrate). Poly(3-hydroxybutyrate) (PHB) is a type of a naturally occurring thermoplastic polymer currently produced microbially inside of the cell wall of a number of wild bacteria species or genetically modified bacteria or yeasts, etc. It is biodegradable and does not present environmental issues post disposal, i.e., articles made from PHB can be composted.

The one or monomers used to produce a PHA can significantly impact the physical properties of the polymer. For example, PHAs can be produced that are crystalline, semi-crystalline, or completely amorphous. For example, poly-4-hydroxybutyrate homopolymer can be completely amorphous with a glass transition temperature of less than about −30° C. and with no noticeable melting point temperature. Polyhydroxybutyrate-valerate copolymers also can be formulated to be semi-crystalline to amorphous having low stiffness characteristics.

Examples of monomer units that can be incorporated in PHAs include 2-hydroxybutyrate, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HH), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center.

In some embodiments, the PHA in the methods described herein is a homopolymer (where all monomer units are the same). Examples of PHA homopolymers include poly 3-hydroxyalkanoates (e.g., poly 3-hydroxypropionate (hereinafter referred to as P3HP)), poly 3-hydroxybutyrate (hereinafter referred to as P3HB) and poly 3-hydroxyvalerate, poly 4-hydroxyalkanoates (e.g., poly 4-hydroxybutyrate (hereinafter referred to as P4HB)), poly 4-hydroxyvalerate (hereinafter referred to as P4HV)) or poly 5-hydroxyalkanoates (e.g., poly 5-hydroxyvalerate (hereinafter referred to as P5HV)).

In certain embodiments, the PHA can be a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as P3HB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV).

An example of a PHA having 4 different monomer units would be PHB-co-3HH-co-3HO-co-3HD or PHB-co-3-HO-co-3HD-co-3HDd. Typically where the PHB3HX has 3 or more monomer units, the 3HB monomer is at least 70% by weight of the total monomers, such as greater than 90% by weight of the total monomers.

In one embodiment of the present disclosure, a cellulose acetate is combined with a PHA that has a crystallinity of about 25% or less and has a low glass transition temperature. For instance, the glass transition temperature can be less than about 10° C., such as less than about 5° C., such as less than about 0° C., such as less than about −5° C., and generally greater than about −40° C., such as greater than about −20° C. Such PHAs can dramatically reduce the stiffness properties of the cellulose acetate, thereby increasing the elongation properties and decreasing the flexural modulus properties. As used herein, the glass transition temperature can be determined by dynamic mechanical analysis in accordance with ASTM Test E1640-09.

When present, one or more PHAs can be contained in the polymer composition in an amount of about 2% or greater, such as about 3% or greater, such as about 5% or greater, such as about 7% or greater, such as about 10% or greater, such as about 12% or greater, such as about 15% or greater, such as about 18% or greater. One or more PHAs are generally present in the polymer composition in an amount of about 30% or less, such as in an amount of about 25% or less, such as in an amount of about 20% or less, such as in an amount of about 15% or less.

In addition to one or more PHAs, the polymer composition can contain various other bio-based polymers, such as a polylactic acid or a polycaprolactone. Polylactic acid also known as "PLAs" are well suited for combining with one or more PHAs. Polylactic acid polymers are generally stiffer and more rigid than PHAs and thus can be added to the polymer composition for further refining the properties of the overall formulation.

Polylactic acid may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the content of one of the monomer units derived from L-lactic acid and the monomer units derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage.

In one particular embodiment, the polylactic acid has the following general structure:

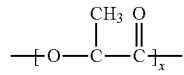

The polylactic acid typically has a number average molecular weight ("$M_n$") ranging from about 40,000 to about 160,000 grams per mole, in some embodiments from about 50,000 to about 140,000 grams per mole, and in some embodiments, from about 80,000 to about 120,000 grams per mole. Likewise, the polymer also typically has a weight average molecular weight ("$M_w$") ranging from about 80,000 to about 200,000 grams per mole, in some embodiments from about 100,000 to about 180,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 $sec^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

Polylactic acid can be present in the polymer composition in an amount of about 1% or greater, such as in an amount of about 3% or greater, such as in an amount of about 5% or greater, and generally in an amount of about 20% or less, such as in an amount of about 15% or less, such as in an amount of about 10% or less, such as in an amount of about 8% or less.

As described above, another bio-based polymer that may be combined with cellulose acetate alone or in conjunction with other bio-based polymers is polycaprolactone. Polycaprolactone, similar to PHAs, can be formulated to have a relatively low glass transition temperature. The glass transition temperature, for instance, can be less than about 10° C., such as less than about −5° C., such as less than about −20° C., and generally greater than about −60° C. The polymers can be produced so as to be amorphous or semicrystalline. The crystallinity of the polymers can be less than about 50%, such as less than about 25%.

Polycaprolactones can be made having a number average molecular weight of generally greater than about 5,000, such as greater than about 8,000, and generally less than about 15,000, such as less than about 12,000. Low molecular weight polycaprolactones can also be produced and used as plasticizers.

Polycaprolactones can be contained in the polymer composition in an amount of about 2% or greater, such as about 3% or greater, such as about 5% or greater, such as about 7% or greater, such as about 10% or greater, such as about 12% or greater, such as about 15% or greater, such as about 18% or greater. Polycaprolactones are generally present in the polymer composition in an amount of about 30% or less, such as in an amount of about 25% or less, such as in an amount of about 20% or less, such as in an amount of about 15% or less.

Other bio-based polymers that may be incorporated into the polymer composition include polybutylene succinate, polybutylene adipate terephthalate, a plasticized starch, other starch-based polymers, and the like. In addition, the bio-based polymer can be a polyolefin or polyester polymer made from renewable resources. For example, such polymers include bio-based polyethylene, bio-based polybutylene terephthalate, and the like.

The polymer composition of the present disclosure may optionally contain various other additives and ingredients. For instance, the polymer composition may contain antioxidants, pigments, lubricants, softening agents, antibacterial agents, antifungal agents, preservatives, flame retardants, and combinations thereof. Each of the above additives can generally be present in the polymer composition in an amount of about 5% or less, such as in an amount of about 2% or less, and generally in an amount of about 0.1% or greater, such as in an amount of about 0.3% or greater.

Flame retardants suitable for use in conjunction with a cellulose ester plastic described herein may, in some embodiments, include, but are not limited to, silica, metal oxides, phosphates, catechol phosphates, resorcinol phosphates, borates, inorganic hydrates, aromatic polyhalides, and the like, and any combination thereof.

Antifungal and/or antibacterial agents suitable for use in conjunction with a cellulose ester plastic described herein may, in some embodiments, include, but are not limited to, polyene antifungals (e.g., natamycin, rimocidin, filipin, nystatin, amphotericin B, candicin, and hamycin), imidazole antifungals such as miconazole (available as MICATIN® from WellSpring Pharmaceutical Corporation), ketoconazole (commercially available as NIZORAL® from McNeil consumer Healthcare), clotrimazole (commercially available as LOTRAMIN® and LOTRAMIN AF® available from Merck and CANESTEN® available from Bayer), econazole, omoconazole, bifonazole, butoconazole, fenticonazole, isoconazole, oxiconazole, sertaconazole (commercially available as ERTACZO® from OrthoDematologics), sulconazole, and tioconazole; triazole antifungals such as fluconazole, itraconazole, isavuconazole, ravuconazole, posaconazole, voriconazole, terconazole, and albaconazole), thiazole antifungals (e.g., abafungin), allylamine antifungals (e.g., terbinafine (commercially available as LAMISIL® from Novartis Consumer Health, Inc.), naftifine (commercially available as NAFTIN® available from Merz Pharmaceuticals), and butenafine (commercially available as LOTRAMIN ULTRA® from Merck), echinocandin antifungals (e.g., anidulafungin, caspofungin, and micafungin), polygodial, benzoic acid, ciclopirox, tolnaftate (e.g., commercially available as TINACTIN® from MDS Consumer Care, Inc.), undecylenic acid, flucytosine, 5-fluorocytosine, griseofulvin, haloprogin, caprylic acid, and any combination thereof.

Preservatives suitable for use in conjunction with a cellulose ester plastic described herein may, in some embodiments, include, but are not limited to, benzoates, parabens (e.g., the propyl-4-hydroxybenzoate series), and the like, and any combination thereof.

Pigments and dyes suitable for use in conjunction with a cellulose ester plastic described herein may, in some embodiments, include, but are not limited to, plant dyes, vegetable dyes, titanium dioxide, silicon dioxide, tartrazine, E102, phthalocyanine blue, phthalocyanine green, quinacridones, perylene tetracarboxylic acid di-imides, dioxazines, perinones disazo pigments, anthraquinone pigments, carbon black, metal powders, iron oxide, ultramarine, calcium carbonate, kaolin clay, aluminum hydroxide, barium sulfate, zinc oxide, aluminum oxide, CARTASOL® dyes (cationic dyes, available from Clariant Services) in liquid and/or granular form (e.g., CARTASOL® Brilliant Yellow K-6G liquid, CARTASOL® Yellow K-4GL liquid, CARTASOL® Yellow K-GL liquid, CARTASOL® Orange K-3GL liquid, CARTASOL® Scarlet K-2GL liquid, CARTASOL® Red K-3BN liquid, CARTASOL® Blue K-5R liquid, CARTASOL® Blue K-RL liquid, CARTASOL® Turquoise K-RL liquid/granules, CARTASOL® Brown K-BL liquid), FASTUSOL® dyes (an auxochrome, available from BASF) (e.g., Yellow 3GL, Fastusol C Blue 74L), and the like, any derivative thereof, and any combination thereof.

In some embodiments, pigments and dyes suitable for use in conjunction with a cellulose ester plastic described herein may be food-grade pigments and dyes. Examples of food-grade pigments and dyes may, in some embodiments, include, but are not limited to, plant dyes, vegetable dyes, titanium dioxide, and the like, and any combination thereof.

Antioxidants may, in some embodiments, mitigate oxidation and/or chemical degradation of a cellulose ester plastic described herein during storage, transportation, and/or implementation. Antioxidants suitable for use in conjunction with a cellulose ester plastic described herein may, in some embodiments, include, but are not limited to, anthocyanin, ascorbic acid, glutathione, lipoic acid, uric acid, resveratrol, flavonoids, carotenes (e.g., beta-carotene), carotenoids, tocopherols (e.g., alpha-tocopherol, beta-tocopherol, gamma-tocopherol, and delta-tocopherol), tocotrienols, tocopherol esters (e.g., tocopherol acetate), ubiquinol, gallic acids, melatonin, secondary aromatic amines, benzofuranones, hindered phenols, polyphenols, hindered amines, organophosphorus compounds, thioesters, benzoates, lactones, hydroxylamines, butylated hydroxytoluene ("BHT"), butylated hydroxyanisole ("BHA"), hydroquinone, and the like, and any combination thereof.

In some embodiments, antioxidants suitable for use in conjunction with a cellulose ester plastic described herein may be food-grade antioxidants. Examples of food-grade antioxidants may, in some embodiments, include, but are not limited to, ascorbic acid, vitamin A, tocopherols, tocopherol esters, beta-carotene, flavonoids, BHT, BHA, hydroquinone, and the like, and any combination thereof.

The polymer composition of the present disclosure can be formed into any suitable polymer article using any technique known in the art. For instance, polymer articles can be formed from the polymer composition through extrusion, injection molding, blow molding, and the like.

Polymer articles that may be made in accordance with the present disclosure include drinking straws, beverage holders, automotive parts, knobs, door handles, consumer appliance parts, and the like.

For instance, referring to FIG. 1, a drinking straw 10 is shown that can be made in accordance with the present disclosure. In the past, drinking straws were conventionally made from petroleum-based polymers, such as polypropylene. The cellulose acetate polymer composition of the present disclosure, however, can be formulated so as to match the physical properties of polypropylene. Thus, drinking straws 10 can be produced in accordance with the present disclosure and be completely biodegradable.

Figure 2:
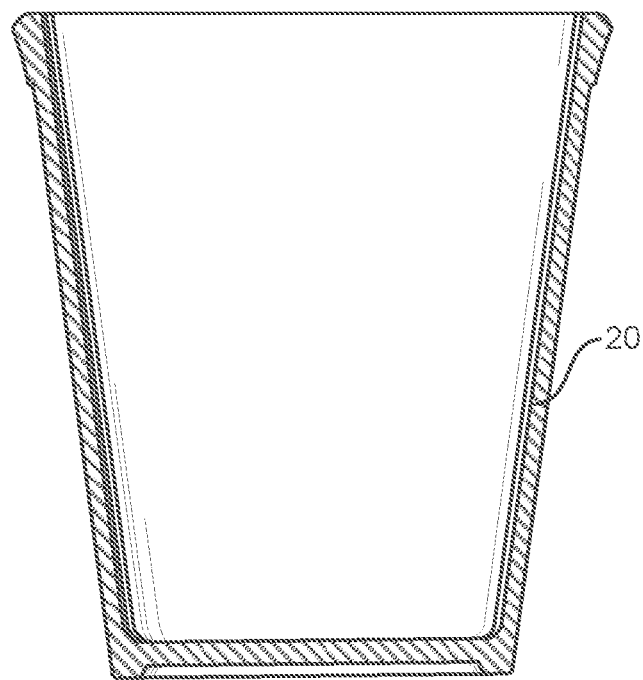
FIG. 2 is a cross-sectional view of a beverage holder that may be made in accordance with the present disclosure.
Figure 7:
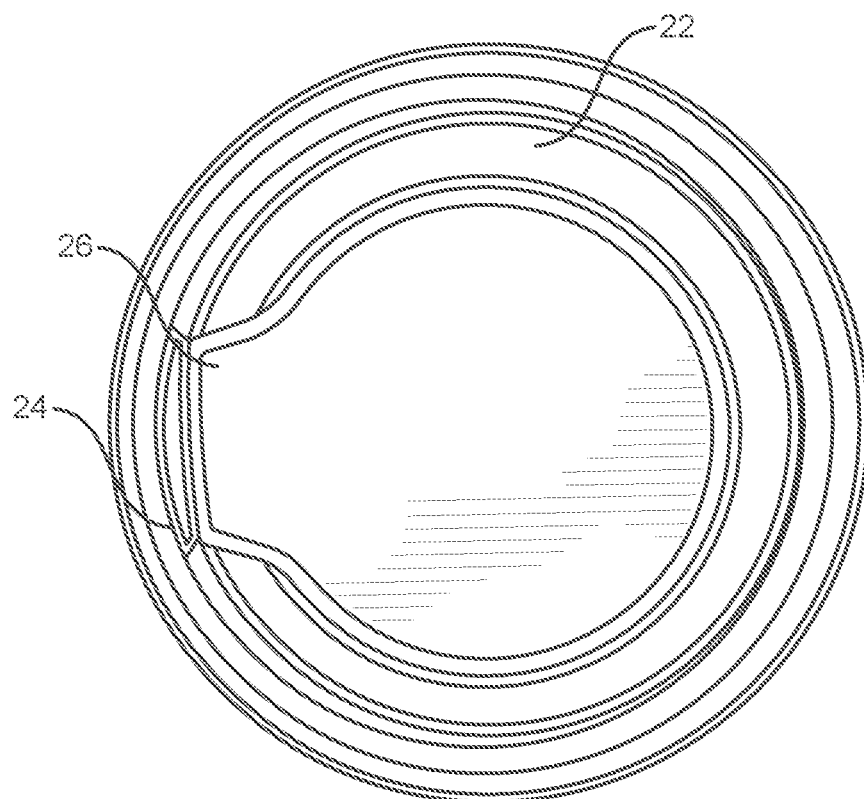
FIG. 7 is a perspective view of a lid made in accordance with the present disclosure.

Referring to FIG. 2, a cup or beverage holder 20 is shown that can also be made in accordance with the present disclosure. The cup 20 can be made, for instance, using injection molding or through any suitable thermoforming process. As shown in FIG. 7, a lid 22 for the cup 20 can also be made from the polymer composition of the present disclosure. The lid can include a pour spout 24 for dispensing a beverage from the cup 20. In addition to lids for beverage holders, the polymer composition of the present disclosure can be used to make lids for all different types of containers, including food containers, package containers, storage containers and the like.

Figure 3:
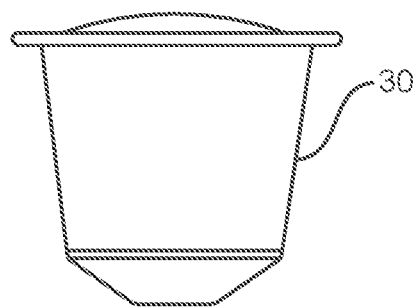
FIG. 3 is a side view of one embodiment of a beverage pod that can be made in accordance with the present disclosure.
Figure 4:
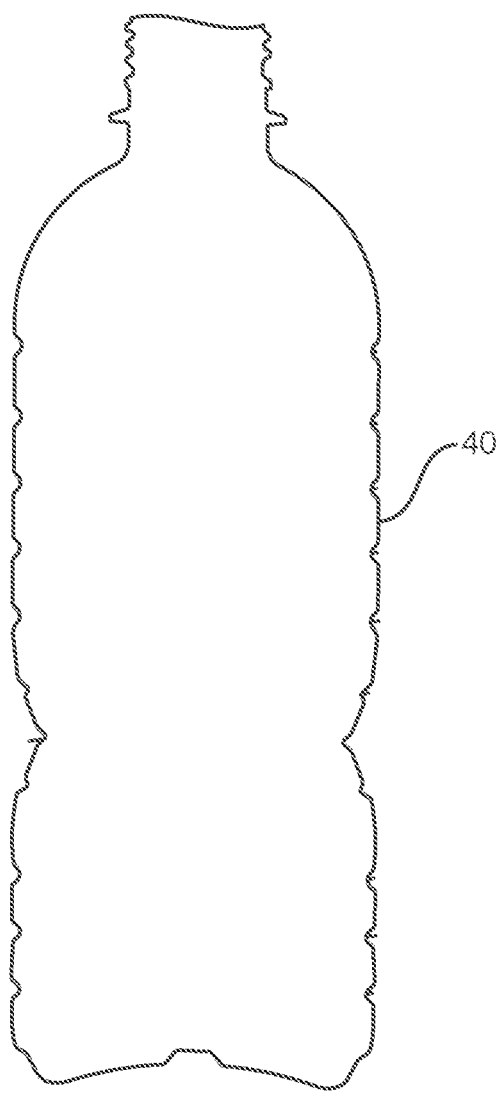
FIG. 4 is a cross-sectional view of a drinking bottle that may be made in accordance with the present disclosure.

In still another embodiment, the polymer composition can be used to produce a hot beverage pod 30 as shown in FIG. 3. In addition to the beverage pod 30, the polymer composition can also be used to produce a plastic bottle 40 as shown in FIG. 4, which can serve as a water bottle or other sport drink container.

Figure 5:
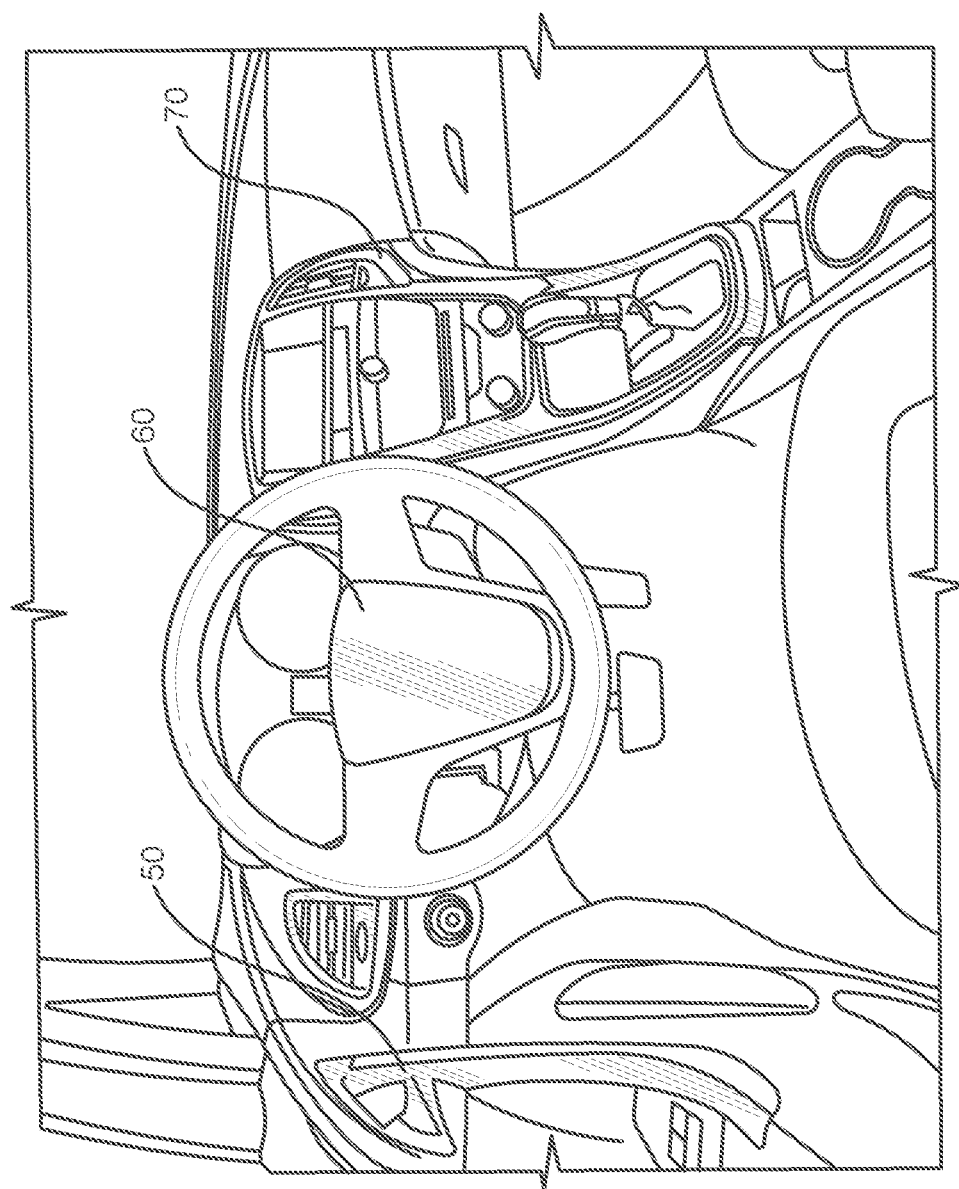
FIG. 5 is a perspective view of an automotive interior illustrating various articles that may be made in accordance with the present disclosure.

Referring to FIG. 5, an automotive interior is illustrated. The automotive interior includes various automotive parts that may be made in accordance with the present disclosure. The polymer composition, for instance, can be used to produce automotive part 50, which comprises at least a portion of an interior door handle. The polymer composition may also be used to produce a part on the steering column, such as automotive part 60. In general, the polymer composition can be used to mold any suitable decorative trim piece or bezel, such as trim piece 70. In addition, the polymer composition can be used to produce knobs or handles that may be used on the interior of the vehicle.

Figure 6:
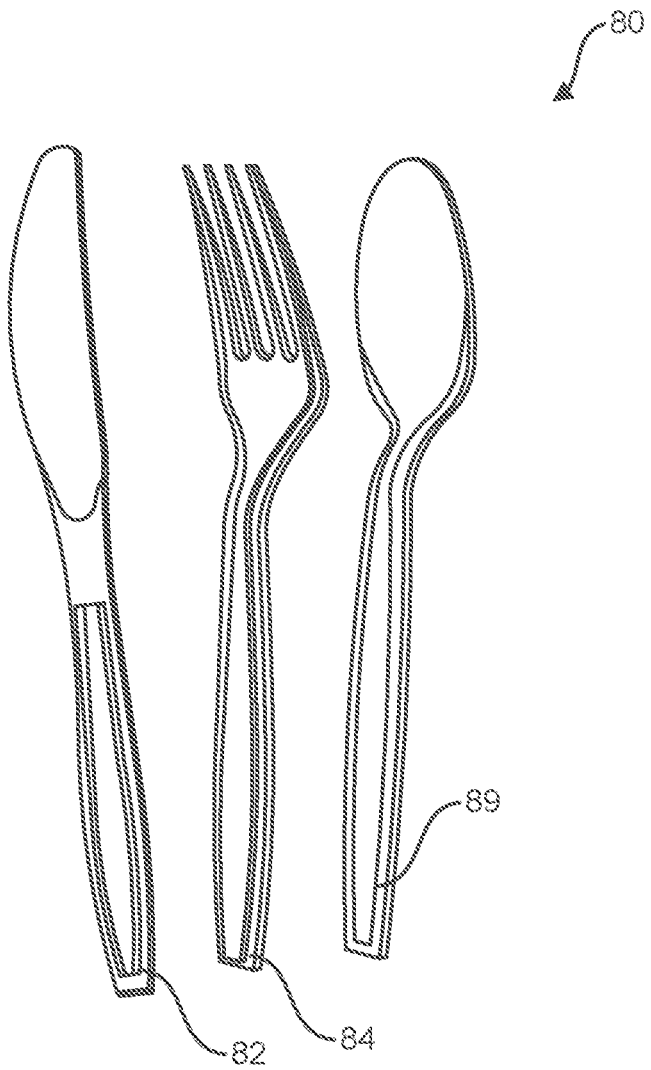
FIG. 6 is a perspective view of cutlery made in accordance with the present disclosure.

The polymer composition is also well suited to producing cutlery, such as forks, spoons, and knives. For example, referring to FIG. 6, disposable cutlery 80 is shown. The cutlery 80 includes a knife 82, a fork 84, and a spoon 86.

Figure 8:
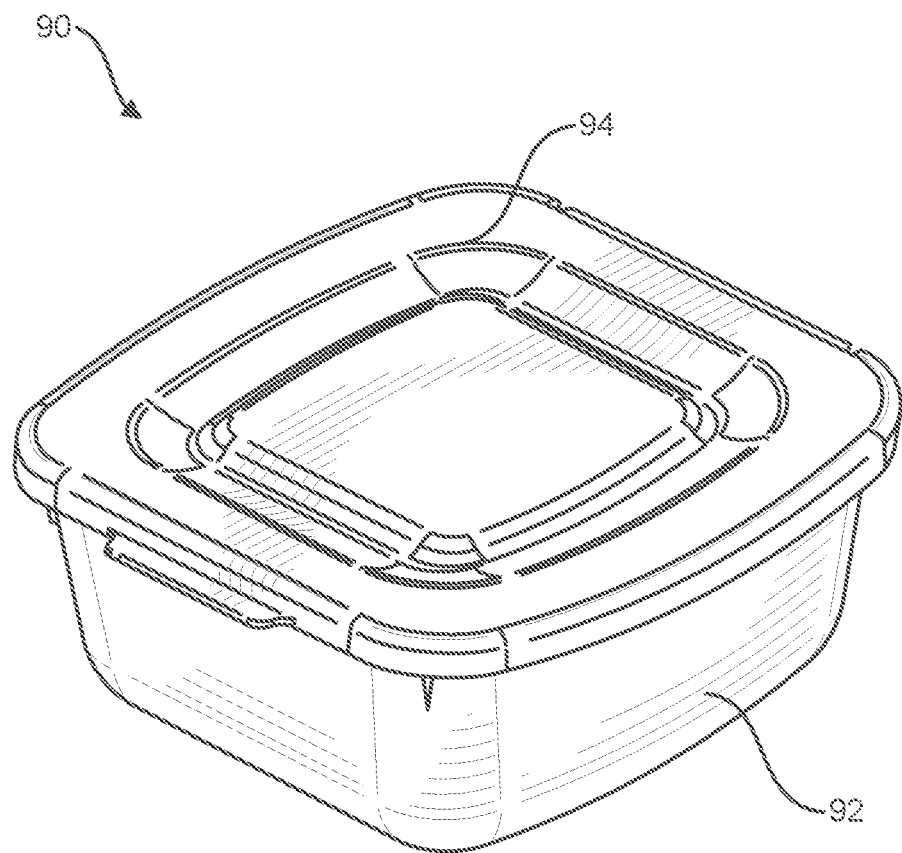
FIG. 8 is a perspective view of a container made in accordance with the present disclosure.

In still another embodiment, the polymer composition can be used to produce a storage container 90 as shown in FIG. 8. The storage container 90 can include a lid 94 that cooperates and engages the rim of a bottom 92. The bottom 92 can define an interior volume for holding items. The container 90 can be used to hold food items or dry goods.

In still other embodiments, the polymer composition can be formulated to produce paper plate liners, eyeglass frames, screwdriver handles, or any other suitable part.

The cellulose ester composition of the present disclosure is particularly well-suited for use in producing medical devices including all different types of medical instruments. The cellulose ester composition, for instance, is well suited to replacing other polymers used in the past, such as polycarbonate polymers. Not only is the cellulose ester composition of the present disclosure biodegradable, but the composition has a unique "warm touch" feel when handled. Thus, the composition is particularly well suited for constructing housings for medical devices. When held or grasped, for instance, the polymer composition retains heat and makes the device or instrument feel warmer than devices made from other materials in the past. The sensation is particularly soothing and comforting to those in need of medical assistance and can also provide benefits to medical providers. In one aspect, the cellulose ester composition used to produce housings for medical devices includes a cellulose ester polymer combined with a plasticizer (e.g. triacetin) and optionally another bio-based polymer. In addition, the composition can contain one or more coloring agents.

Figure 9:
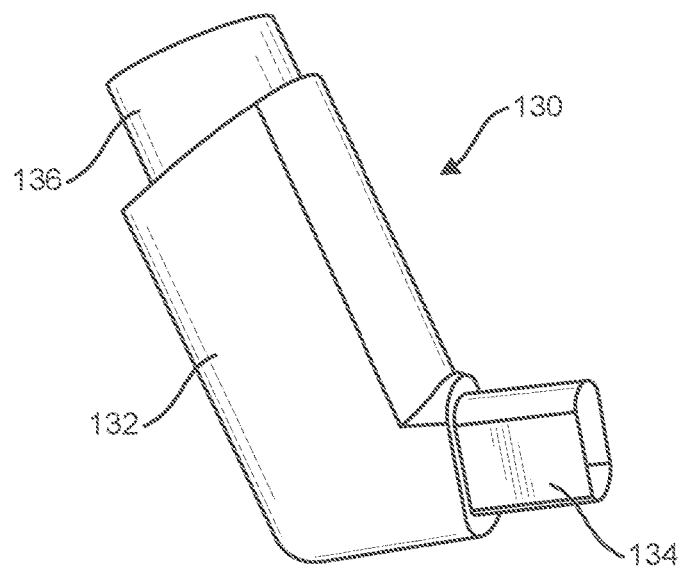
FIG. 9 illustrates one embodiment of a medical apparatus comprising a composition prepared according to the present disclosure.

Referring to FIG. 9, for instance, an inhaler 130 is shown that may be made from the cellulose ester polymer composition. The inhaler 130 includes a housing 132 attached to a mouthpiece 134. In operative association with the housing 132 is a plunger 136 for receiving a canister containing a composition to be inhaled. The composition may comprise a spray or a powder.

During use, the inhaler 130 administers metered doses of a medication, such as an asthma medication to a patient. The asthma medication may be suspended or dissolved in a propellant or may be contained in a powder. When a patient actuates the inhaler to breathe in the medication, a valve opens allowing the medication to exit the mouthpiece. In accordance with the present disclosure, the housing 132, the mouthpiece 134 and the plunger 136 can all be made from a polymer composition as described above.

Figure 10:
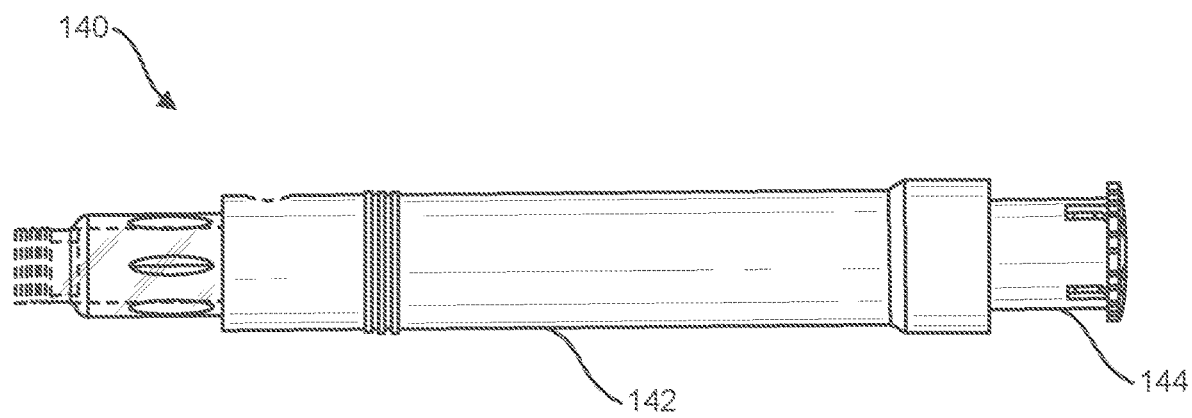
FIG. 10 illustrates another embodiment of a medical apparatus comprising a composition prepared according to the present disclosure.

Referring to FIG. 10, another medical product that may be made in accordance with the present disclosure is shown. In FIG. 10, a medical injector 140 is illustrated. The medical injector 140 includes a housing 142 in operative association with a plunger 144. The housing 142 may slide relative to the plunger 144. The medical injector 140 may be spring loaded. The medical injector is for injecting a drug into a patient typically into the thigh or the buttocks. The medical injector can be needleless or may contain a needle. When containing a needle, the needle tip is typically shielded within the housing prior to injection. Needleless injectors, on the other hand, can contain a cylinder of pressurized gas that propels a medication through the skin without the use of a needle. In accordance with the present disclosure, the housing 142 and/or the plunger 144 can be made from a polymer composition as described above.

Figure 12:
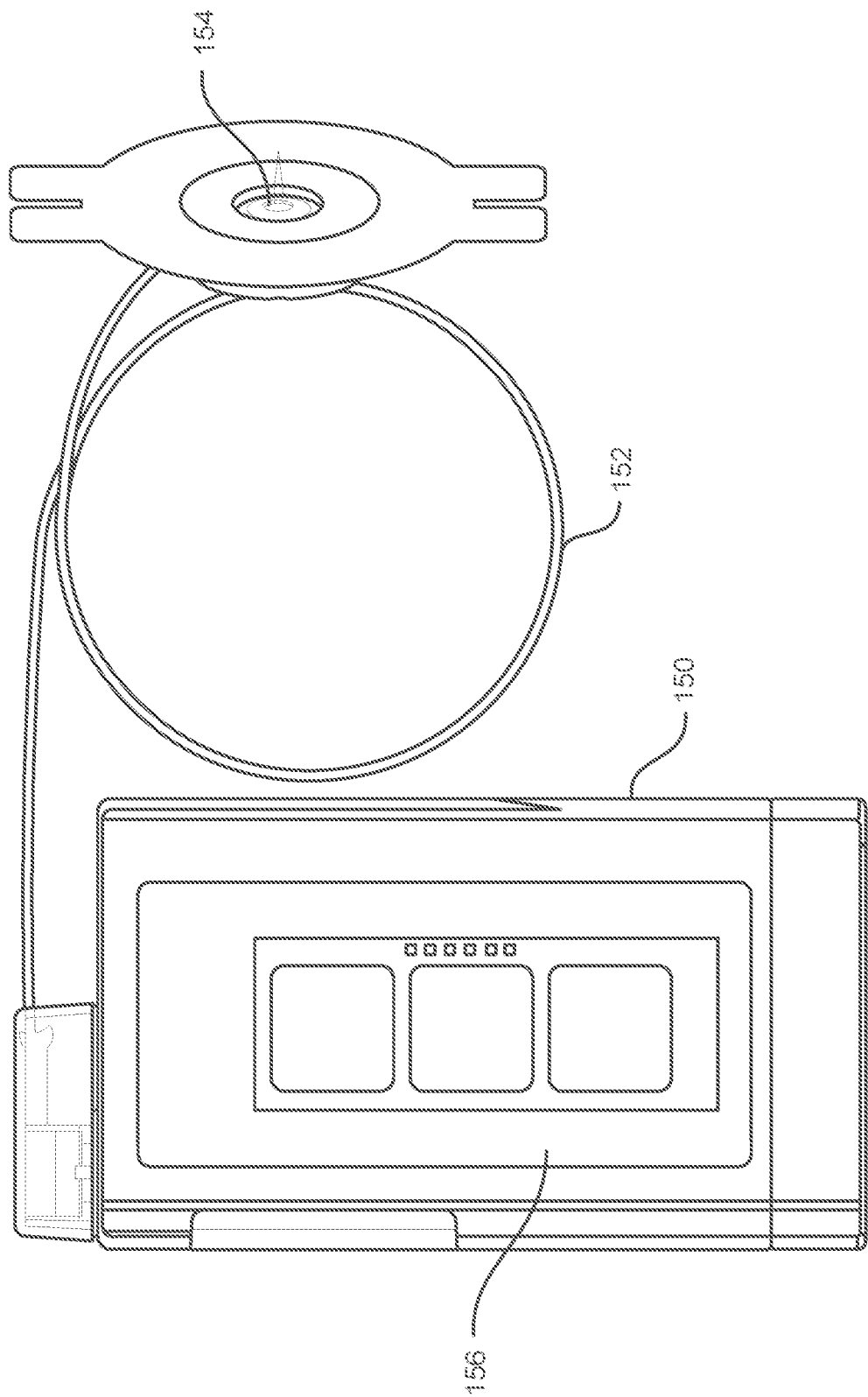
FIG. 12 illustrates another embodiment of a medical apparatus comprising a composition prepared according to the present disclosure.

The medical injector 140 as shown in FIG. 10 can be used to inject insulin. Referring to FIG. 12, an insulin pump device 150 is illustrated that can include a housing 156 also made from the polymer composition of the present disclosure. The insulin pump device 150 can include a pump in fluid communication with tubing 152 and a needle 154 for subcutaneously injecting insulin into a patient.

The polymer composition of the present disclosure can also be used in all different types of laparoscopic devices. Laparoscopic surgery refers to surgical procedures that are performed through an existing opening in the body or through one or multiple small incisions. Laparoscopic devices include different types of laparoscopes, needle drivers, trocars, bowel graspers, rhinolaryngoscopes and the like.

Figure 11:
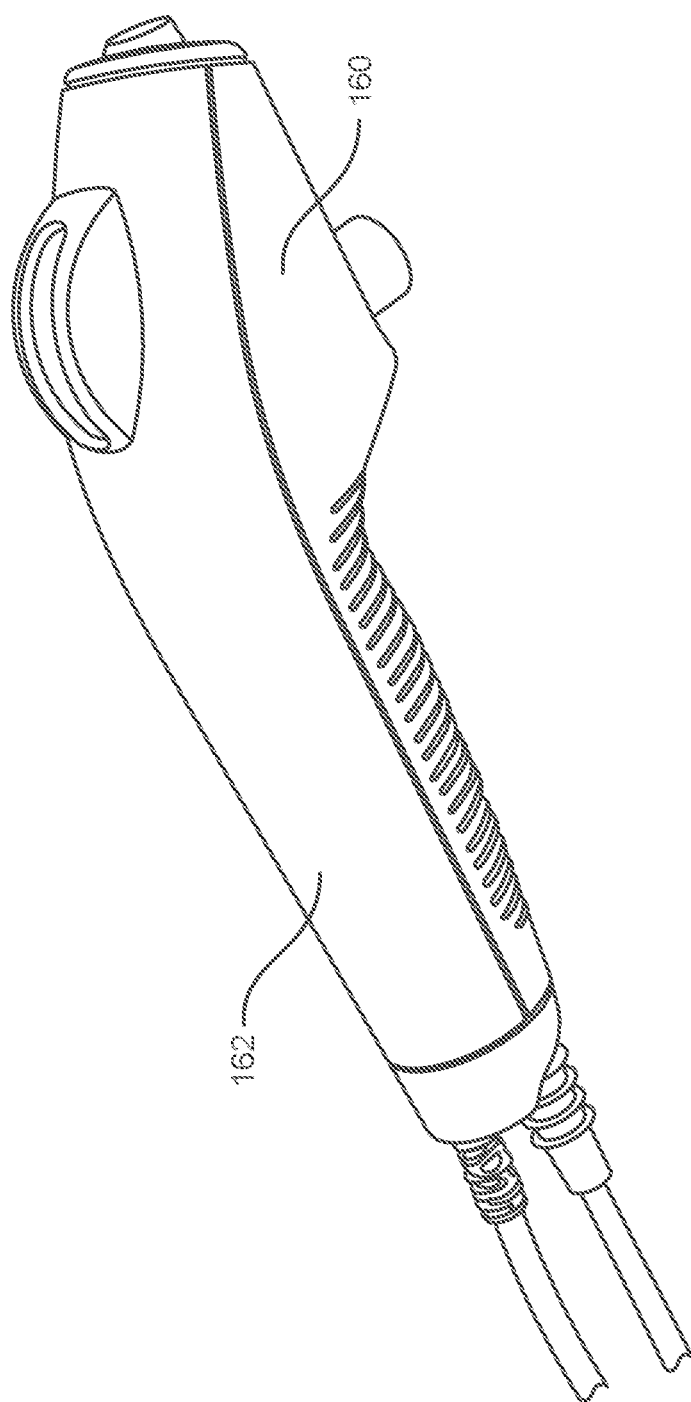
FIG. 11 illustrates still another embodiment of a medical apparatus comprising a composition prepared according to the present disclosure.

Referring to FIG. 11, for example, a rhinolaryngoscope 160 made in accordance with the present disclosure is shown. The rhinolaryngoscope 160 includes small, flexible plastic tubes with fiberoptics for viewing airways. The rhinolaryngoscope can be attached to a television camera to provide a permanent record of an examination. The rhinolaryngoscope 160 includes a housing 162 made from the polymer composition of the present disclosure. The rhinolaryngoscope 160 is for examining the nose and throat. With a rhinolaryngoscope, a doctor can examine most of the inside of the nose, the eustachian tube openings, the adenoids, the throat, and the vocal cords.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer composition comprising:
   a cellulose acetate comprising greater than 90% by weight cellulose diacetate;
   triacetin or polyethylene glycol present in the polymer composition in an amount of from about 8% by weight to about 40% by weight;
   a polycaprolactone present in the polymer composition in an amount of from about 2% by weight to about 30% by weight, the polycaprolactone having a number average molecular weight of less than about 15,000 g/mol;

at least one impact modifier, the at least one impact modifier comprising acrylic core/shell particles; and wherein the polymer composition exhibits an Izod notched impact strength of about 100 J/m at 23° C. or greater.

2. A polymer composition as defined in claim 1, wherein the polymer composition exhibits a flexural modulus of about 2000 MPa or less and about 500 MPa or greater and wherein the elongation at break of the polymer composition is about 12% or greater and about 150% or less and wherein the Izod notched impact strength of the polymer composition is about 110 J/m or greater and about 600 J/m or less.

3. A polymer composition as defined in claim 1, wherein the polymer composition contains at least two impact modifiers comprising a bio-based impact modifier and acrylic core/shell particles.

4. A polymer composition as defined in claim 3, wherein the bio-based impact modifier has a glass transition temperature of less than about −10° C.

5. A polymer composition as defined in claim 3, wherein the bio-based impact modifier is amorphous.

6. A polymer composition as defined in claim 3, wherein the bio-based impact modifier comprises a polyhydroxyalkanoate.

7. A polymer composition as defined in claim 3, wherein the bio-based impact modifier comprises a polybutylene polymer.

8. A polymer composition as defined in claim 7, wherein the bio-based impact modifier comprises a polybutylene adipate terephthalate or a polybutylene succinate.

9. A polymer composition as defined in claim 1, wherein the core of the impact modifier is made from a first polymer and the shell is made from a second polymer and wherein the second polymer has a lower glass transition temperature than the first polymer.

10. A polymer composition as defined in claim 9, wherein the core/shell particles further comprise a bio-based polymer.

11. A polymer composition as defined in claim 1, wherein the acrylic core/shell particles include a core comprised of a polymer formed from a butyl acrylate monomer, an ethylhexyl acrylate monomer, or from a mixture thereof.

12. A polymer composition as defined in claim 1, wherein the acrylic core/shell particles include a shell comprised of methyl methacrylate.

13. A polymer composition as defined in claim 1, wherein the cellulose acetate is present in the composition in an amount of from about 15% to about 85% by weight and the plasticizer is present in the composition in an amount of from about 12% to about 35% by weight.

14. An article made from the polymer composition as defined in claim 1.

15. An article as defined in claim 14, wherein the article is a beverage holder, a drinking straw, an automotive part or cutlery.

16. A medical device comprising a housing made from the polymer composition according to claim 1.

17. A polymer composition comprising:

a cellulose acetate comprising greater than 90% by weight cellulose diacetate;

triacetin or polyethylene glycol present in the polymer composition in an amount greater than 15% by weight to about 40% by weight;

a polycaprolactone present in the polymer composition in an amount of from about 2% by weight to about 30% by weight, the polycaprolactone having an average molecular weight of less than about 15,000 g/mol;

at least one impact modifier, the impact modifier comprising acrylic core/shell particles; and wherein the polymer composition exhibits an Izod notched impact strength of about 100 J/m at 23° C. or greater.

* * * * *